(12) United States Patent
Zhang

(10) Patent No.: US 9,489,128 B1
(45) Date of Patent: Nov. 8, 2016

(54) SOFT KEYBOARD WITH SIZE CHANGEABLE KEYS FOR A SMART PHONE

(75) Inventor: Wei Zhang, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 309 days.

(21) Appl. No.: 13/452,459

(22) Filed: Apr. 20, 2012

(51) Int. Cl.
*G06F 3/0488* (2013.01)
*G06F 3/048* (2013.01)
*G06F 3/01* (2006.01)

(52) U.S. Cl.
CPC ........... *G06F 3/04886* (2013.01); *G06F 3/017* (2013.01); *G06F 3/048* (2013.01)

(58) Field of Classification Search
CPC ............. G06F 3/04886; G06F 3/0482; G06F 3/04842; G06F 3/04883; G06F 3/048; G06F 3/017
USPC ........................................................ 715/773
See application file for complete search history.

(56) References Cited

U.S. PATENT DOCUMENTS

| | | | |
|---|---|---|---|
| 6,573,844 B1* | 6/2003 | Venolia et al. | 341/22 |
| 2010/0265181 A1* | 10/2010 | Shore | 345/168 |
| 2011/0029862 A1* | 2/2011 | Scott et al. | 715/261 |
| 2011/0074685 A1* | 3/2011 | Causey et al. | 345/168 |
| 2011/0078613 A1* | 3/2011 | Bangalore | 715/773 |
| 2011/0258542 A1* | 10/2011 | Kenney | G06F 3/04886 715/702 |
| 2011/0264442 A1* | 10/2011 | Huang et al. | 704/9 |
| 2012/0236036 A1* | 9/2012 | Kao | 345/661 |
| 2013/0125034 A1* | 5/2013 | Griffin et al. | 715/773 |

* cited by examiner

*Primary Examiner* — Aneeta Yodichkas
*Assistant Examiner* — Joseph Fox
(74) *Attorney, Agent, or Firm* — Sutherland Asbill & Brennan LLP

(57) ABSTRACT

An approach for a soft keyboard with size changeable keys for a smart phone is provided. Depending on a prior input to the keyboard, one or more keys on the soft keyboard can be increased in size. When an additional input to the keyboard is entered, the keys of increased size are re-sized to their original sizes, and depending on the additional input to the keyboard, one or more keys on the soft keyboard can be increased in size.

26 Claims, 3 Drawing Sheets

SOFT KEYBOARD WITH SIZE CHANGEABLE KEYS FOR A SMART PHONE

BACKGROUND

A graphical interface-generated keyboard, or soft keyboard, for certain user devices, such as a mobile phone or smart phone, is generally too small for some users to comfortably use. Typing on a soft keyboard can result in a relatively high rate of spelling errors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
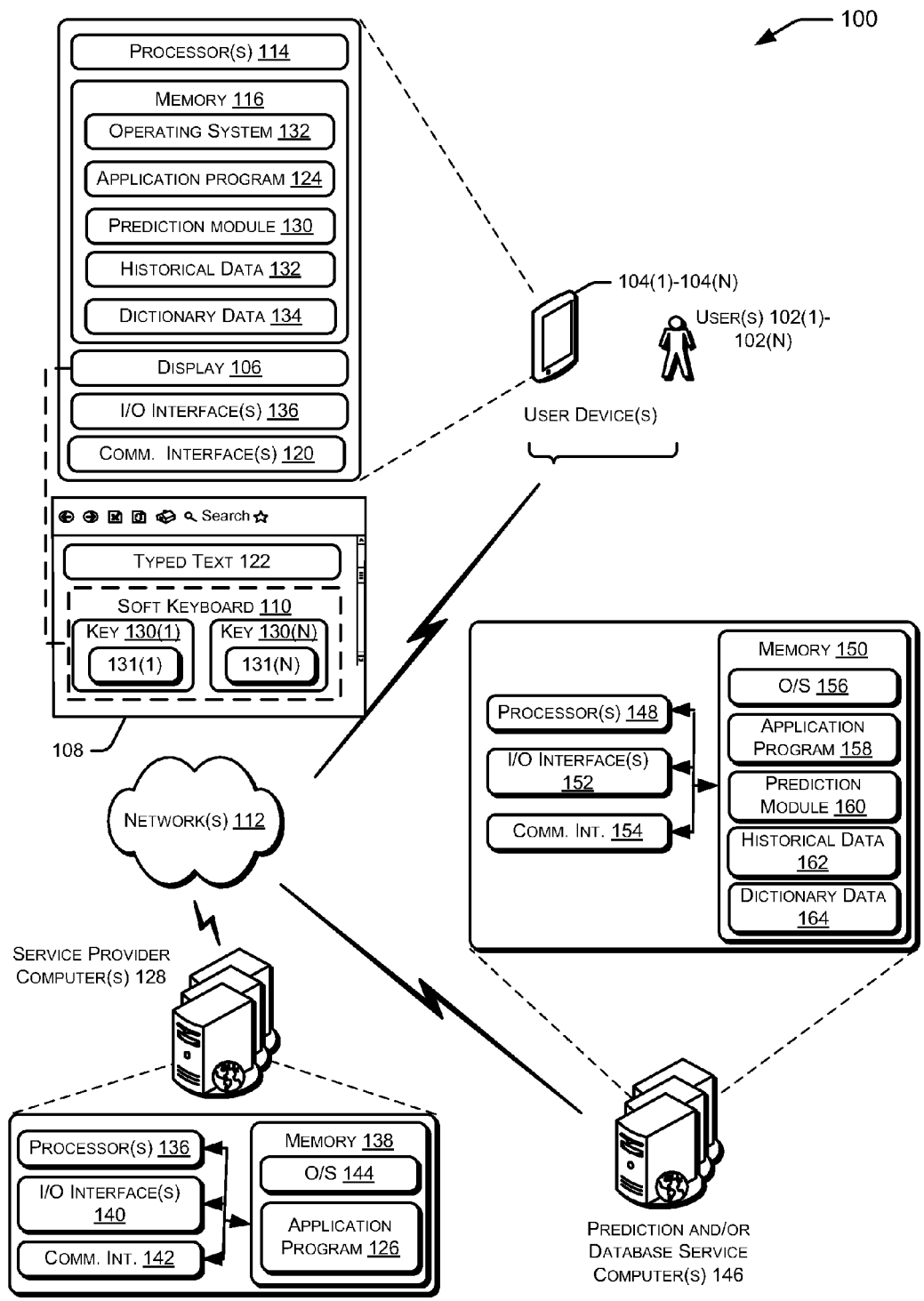
FIG. 1 illustrates an example architecture for implementing a soft keyboard with size changeable keys for a smart phone in accordance with an embodiment of the invention.

Embodiments of the present disclosure are directed to, among other things, providing a soft keyboard with size changeable keys for a smart phone. Embodiments of the invention not only can relate to smart phones but can relate to other processor-based devices, such as mobile devices, mobile phones, tablets, messaging devices, laptops, desktops, tablet computers, televisions, set-top boxes, game consoles, touch screen devices, devices capable of generating a virtual keyboard and so forth. In one example embodiment, a mobile phone can include a graphical interface with a soft keyboard with size changeable keys. To improve user accuracy when typing on the soft keyboard, the keys can change sizes depending on real time input to the soft keyboard.

In some embodiments, the keys may change sizes depending on a comparison of previous inputs to historical and/or dictionary data. For example, a user can begin typing the word GEORGIA on a soft keyboard of a mobile phone. Based on a real time analysis of the user's key inputs, certain keys on the soft keyboard can be increased in size depending on a comparison of the key inputs to historical data. Thus, if the user has already typed GEORG, and the user has previously typed the word GEORGIA but has never typed the word GEORGE, the next letter may be predicted as I, and the size of the corresponding I key on the soft keyboard can be increased in size. As another example, a user can begin typing the word GEORGIA on a soft keyboard of a mobile phone. Based on a comparison of the user's key inputs to dictionary data, certain keys on the soft keyboard can be increased in size depending on the one or more words the user may be typing. Thus, if the user has already typed GEORG, the words the user may ultimately type may be predicted as GEORGE and GEORGIA, and the size of the corresponding E and I keys on the soft keyboard can be increased in size. When the user selects the I key, the user's key inputs can be further compared to dictionary data, and the comparison process can be repeated. Thus, continuing this example, the words the user may ultimately type may be predicted as GEORGIAN and GEORGIA'S, and the size of the corresponding N and ' keys on the soft keyboard can be increased in size. In some examples, more than one key on a soft keyboard can be simultaneously increased in size. In some examples, the number of keys of increased size can be limited depending on the number of predicted words, the number of keys per line of the soft keyboard, and the relative position of the keys on the soft keyboard. In any instance, increasing the size of keys on a soft keyboard of a smart phone or mobile device can facilitate increased speed, accuracy, and efficiency in typing on the soft keyboard.

In one some embodiments, increased key sizes on a soft keyboard can permit a user to readily locate each key for subsequent input. Thus, when a user is typing a word on a relatively small soft keyboard of, for example, a mobile phone, the increased key sizes of each letter of one or more predicted words on the soft keyboard can be readily identified by the user as the user types each letter of a desired word. The identification and increased size of relevant keys corresponding to the desired word may decrease user typing errors since irrelevant keys may not be increased in size, and the relative probability the user will select a key with an increased size should increase compared to the probability the user will select an irrelevant key with a relatively smaller size.

In some embodiments, the characters or alphanumeric symbols on each key of a soft keyboard can be highlighted, increased in size, differentiated in shape, or otherwise displayed with additional prominence, either alone or in addition to, increasing the size of each key corresponding to a predicted word when the user is typing a desired word. This may further increase the probability the user may select a key corresponding to a predicted word.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for providing a soft keyboard with size changeable keys for a smart phone may be implemented. In architecture 100, one or more users 102(1)-102(N) may utilize respective user devices 104(1)-104(N) (e.g., a smart phone, mobile phone, tablet, messaging device, laptop, desktop, tablet computer, television, set-top box, game console, a touch screen device, a device capable of generating a virtual keyboard, etc.) with one or more displays 106 and a user interface 108 with a graphical interface-generated keyboard, or soft keyboard 110, to interact with an application program, prepare an email or message for sending, or access at least one website, via one or more networks 112. The user device 102 can comprise one or more processors 114, one or more memories 116, one or more input/output ("I/O") interfaces 118, and one or more communication interfaces 120.

The one or more displays 106 can be configured to present visual information, such as typed text 122, to the user 102(1). In some implementations the display 106 may comprise an emissive display configured to emit light to form an image. Emissive displays include, but are not limited to, backlit liquid crystal displays, plasma displays, cathode ray tubes, light-emitting diodes, image projectors, and so forth.

The user interface 108 can be generated on the one or more displays 106 by the user device 102 executing an application program 124 stored on the user device 102. The user interface 108 can include a soft keyboard 110 with one or more keys 130(1)-130(N), with each key representing a respective alphanumeric character. One or more keys may also represent respective punctuation marks, emoticons, symbols, and the like. In some embodiments, the user interface 108, soft keyboard 110, and one or more keys 130(1)-130(N) with respective characters 131(1)-131(N) on each key, may be generated by an application program or website hosted remote from the user device 104(1), such as by a service provider computer 128.

In some examples, the networks 112 may include any one or a combination of multiple different types of networks, such as cable networks, the Internet, wireless networks, cellular networks, and other private and/or public networks. The networks 112 may comprise one or more private networks, public networks such as the Internet, or a combination of both configured to transfer data between two or more devices.

The one or more processors 114 may comprise one or more cores and is configured to access and execute at least in part program instructions stored in the one or more memories 116. In some examples, the one or more processors 114 may be implemented as appropriate in hardware, software, firmware, or combinations thereof. Various implementations of the one or more processors 114 may include computer-executable or machine-executable instructions written in any suitable programming language to perform the various functions described. The memories 116 may be volatile (such as random access memory ("RAM")) and/or non-volatile (such as read-only memory ("ROM"), flash memory, etc.), and may include multiple different types of memory, such as static random access memory ("SRAM"), dynamic random access memory ("DRAM"), or ROM. The memory 122 is an example of computer-readable storage media. For example, computer-readable storage media may include volatile and non-volatile, removable and non-removable media implemented in any method or technology for storage of information such as computer-readable instructions, data structures, program modules, or other data. The one or more memories 116 is an example of computer storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

In any instance, the instructions may include an operating system 132 configured to manage hardware resources, such as the I/O interfaces 134, and provide various services to applications executing on the one or more processors 114. The one or more memories 116 may also store one or more application programs, such as 124, including a prediction module 130 and an Internet browser application. In some embodiments, the Internet browser application may be configured to accept input, such as an Internet or web page coded input using a markup language such as Hyper Text Markup Language ("HTML"), and present the associated content to the user 102, such as via the display 106 and user interface 108. The memories 116 can also store historical data 132 and a dictionary data 134. Historical data 132 can include one or more previous inputs and/or words that were input to the user device 104, or that were input by the particular user 102(1) or one or more users 102(1)-102(N). Dictionary data 134 can include one or more words in any number of languages. Further, the memories 116 may store data files containing information about the operating system, application programs or modules, previously stored content, portions of content, configuration files, and so forth.

In some embodiments, some or all of the functionality associated with the prediction module 130 may be performed by the operating system 132. In some embodiments, some or all of the functionality associated with the prediction module 130 may operate in conjunction with other features or functionality provided by an application program, such as a search engine providing a query window with a drop down menu including one or more prior search queries.

The one or more I/O interfaces 118 may also be provided in the user device 104(1). These I/O interfaces 118 allow for coupling devices such as keyboards, a mouse, pens, voice input devices, joysticks, touch input devices, touch sensors, cameras, microphones, speakers, haptic output devices, printers, memory, and so forth to the user device 104.

The one or more communication interfaces 120 can provide for the transfer of data between the user device 104(1) and another device directly, via the network 112, or both. The communication interfaces 120 may include, but are not limited to, personal area networks ("PANs"), wired local area networks ("LANs"), wireless local area networks ("WLANs"), wireless wide-area networks ("WWANs"), and so forth. The communication interfaces 120 may utilize acoustic, radio frequency, optical, or other signals to exchange data between the user device 104 and another device such as an access point, a host computer, a router, a reader device, another user device, and the like.

The service provider computers 128 can be one or more processor-based devices that may comprise one or more processors 136, one or more memories 138, one or more input/output ("I/O") interfaces 140, and one or more communication interfaces 142. The one or more memories 138 may store instructions for execution by the one or more processors 136 to perform certain actions or functions.

These instructions may include an operating system 144 configured to manage hardware resources, such as the I/O interfaces 140, and provide various services to applications executing on the one or more processors 136. The one or more memories 138 may also store one or more application programs, such as 126, which may facilitate hosting one or more websites by the service provider computers 128.

Additionally, in some embodiments, one or more prediction and/or database service computers 146 may be in communication with the user device 104(1) to provide prediction and/or database services for the user device 104(1). The one or more prediction and/or database service computers 146 can be one or more processor-based devices that may comprise one or more processors 148, one or more memories 150, one or more input/output ("I/O") interfaces 152, and one or more communication interfaces 154. The one or more memories 150 may store instructions for execution by the one or more processors 148 to perform certain actions or functions. These instructions may include an operating system 156 configured to manage hardware resources, such as the I/O interfaces 152, and provide various services to applications executing on the one or more processors 148. The one or more memories 150 may also store one or more application programs, such as 158, and a prediction module 160. The memories 150 can also store historical data 162 and a dictionary data 164. Historical data 162 can include one or more previous inputs and/or words that were input to the user device 104(1), or that were input by the particular user 102(1) or one or more users 102(1)-102(N). Dictionary data 164 can include one or more words in any number of languages. The historical data 162 and dictionary data 164 described in the embodiment of FIG. 1 can be stored both on the "server-side" and on the "client-side" as historical data 132 and dictionary data 134 stored on the user device, such as 104(1). In some embodiments, the historical data 132 and/or dictionary data 134 on the user device, such as 104(1), can be synchronized or otherwise updated by communication with the one or more prediction and/or database service computers 146, which can store the historical data 162 and/or dictionary data 164. The synchronization or updating can be performed on a periodic, continuous, or infrequent basis, or may be performed upon boot or start-up of the user device, such as 104(1).

Further, the memories 150 may store data files containing information about the operating system, application programs or modules, previously stored content, portions of content, configuration files, and so forth. It should be understood that any functionality described herein may be provided by any of these devices and/or computers, especially by way of the user device 104(1) and the prediction and/or database service computers 124. Additionally, as desired, the service provider computers 122 and prediction and/or database service computers 124 may be the same computers.

In one non-limiting example, the user 102(1) may interact with the user device 104(1), such as a smart phone, using the soft keyboard 110 generated on the user interface 108 of the display 106 associated with the user device 104(1). In some aspects, the user 102(1) may use the soft keyboard 110 to prepare an email or message for sending, enter text to an application program, or enter text to a webpage or website. In any instance, the user 102(1) uses one or more keys 130(1)-130(N) to enter one or more inputs to the user interface 108 corresponding to the user's desired text. As the user 102(1) enters each input to the user interface 108, each input is received by the processor 114 and/or prediction module 130 associated with the user device 104(1), and stored by the processor 114 and/or prediction module 130. Resulting inputs can be displayed as typed text 122 on the user interface 108. As needed, the processor 114 and/or prediction module 130 can store the inputs in memory 116, or in some embodiments, with the historical data 132. After each input, the prediction module 130 can interact with either or both of the historical data 132 and dictionary data 134 to predict or generate one or more predicted keyboard inputs.

Predicted keyboard inputs can be generated by any number of techniques or processes. Comparative, hierarchical, contextual, and other predictive techniques and processes may be used.

In some embodiments, the prediction module 130 can interact with the historical data 132 and compare one or more inputs to previously stored inputs or words in the historical data 132. Based at least in part on the comparison, the prediction module 130 can return one or more predicted inputs to the processor 114. The processor 114 can increase a size of one or more keys 130(1)-130(N) on the soft keyboard 110 corresponding to the one or more predicted inputs. In some instances, an increase in height and/or width of each key, such as 130(1), corresponding to one or more predicted inputs can be output by the processor 114 to the soft keyboard 110. In some instances, the shape of each key, such as 130(1), corresponding to one or more predicted inputs can be differentiated in shape and/or displayed with additional prominence. In some instances, an increase in the size of a character 131(1)-131(N) on a key, such as 130(1), corresponding to one or more predicted inputs can be output by the processor 114 to the soft keyboard 110. In some instances, the characters 131(1)-131(N) on a key, such as 130(1) can be highlighted, increased in size, differentiated in shape, and/or otherwise displayed with additional prominence, either alone or in addition to, increasing the size of each key corresponding to one or more predicted inputs. In any instance, the increased size of the keys 130(1)-130(N) and/or characters 131(1)-131(N) on the keys 130(1)-130(N) should facilitate fewer typing errors and may increase user efficiency when using the soft keyboard 110.

In some embodiments, the prediction module 130 can interact with the dictionary data 134 and compare one or more inputs to previously stored words in the dictionary data 134. Based at least in part on the comparison, the prediction module 130 can return one or more candidate or probable words, from which one or more predicted inputs can be returned to the processor 114. Similar to above, the processor 114 can increase a size of one or more keys 130(1)-130(N) on the soft keyboard 110 corresponding to the one or more predicted inputs. In some instances, an increase in height and/or width of each key, such as 130(1), corresponding to one or more predicted inputs can be output by the processor 114 to the soft keyboard 110. In some instances, the shape of each key, such as 130(1), corresponding to one or more predicted inputs can be differentiated in shape and/or displayed with additional prominence. In some instances, an increase in the size of a character 131(1)-131(N) on a key, such as 130(1), corresponding to one or more predicted inputs can be output by the processor 114 to the soft keyboard 110. In some instances, the characters 131(1)-131(N) on a key, such as 130(1) can be highlighted, increased in size, differentiated in shape, and/or otherwise displayed with additional prominence, either alone or in addition to, increasing the size of each key corresponding to one or more predicted inputs. In any instance, the increased size of the keys 130(1)-130(N) and/or characters 131(1)-

131(N) on the keys 130(1)-130(N) should facilitate fewer typing errors and may increase user efficiency when using the soft keyboard 110.

In some embodiments, the prediction module 130 can interact with either or both the locally stored historical data 132 and the dictionary data 134. In some embodiments, the prediction module 130 may also interact with the historical data 162 and/or dictionary data 164 stored on the server-side, such as by communication with the one or more prediction and/or database service computers 146. In some embodiments, historical data 132, 162 and/or dictionary 134, 164, in one or more languages, may be associated with a single entity or with multiple entities, which may be related or unrelated to each other. Similar to above, based at least in part on the comparisons, the prediction module 130 can return one or more candidate or probable words, from which one or more predicted inputs can be returned to the processor 114. Candidate probable words can include, but are not limited to, a high certainty set of words, a list of frequently typed words in order of frequency, a list of popular words, etc.

In some embodiments, the historical data 132 and/or the dictionary data 134 can include hierarchical data and/or words based on a frequency of use. For example, the historical data 132 may include a counter for each time a word is input or otherwise stored in the historical data 134 by a user 102(1) or users 102(1)-102(N). By way of further example, the dictionary data 134 may include data associated with the occurrence of words in a predetermined set of materials, such as the frequency of use of the words THAT, THE, THIS, THOSE, and THUS in a set of 1000 randomly selected books or webpages. By way of further example, the historical data and/or dictionary data 134 may include data associated with the occurrence of words input to a respective user device, such as 104(1)-104(N), by one or more users, such as 102(1)-102(N), such as the frequency of use of the words THAT, THE, THIS, THOSE, and THUS by 1,000,000 users in the past week.

In some embodiments, the historical data 132 and/or the dictionary data 134 can include contextual data and/or words based on an application program, website, or functionality the user 102(1) or user device 104(1) may be implementing or interacting with. For example, if the user 102(1) is using an application program specific to the sport of football in the State of Georgia, certain contextual words or terms may be included, such as the words and terms YELLOW, JACKETS, BULLDOGS, and DAWGS.

After the processor 114 increases the size of one or more keys, such as 130(1), or one or more characters, such as 131(1), on respective keys, such as 130(1), and the user 102(1) may select a new key, such as 130(N), by inputting the key 130(N) on the soft keyboard 110. The new input is received by the processor 114 and/or prediction module 130 associated with the user device 104(1), and stored by the processor 114 and/or prediction module 130. The processor 114 can change the size of one or more prior changed keys 130(1) or characters 131(1) to an original size. As needed, the processor 114 and/or prediction module 130 can store the new input in memory 116, or in some embodiments, with the historical data 132. In some embodiments, data associated with one or more keys the user 102(1) does not select as an input can be stored by the processor 114 and used in subsequent predictions by the prediction module 130. In any instance, after the new input, the prediction module 130 can interact with either or both of the historical data 132 and dictionary data 134 to predict or generate one or more predicted keyboard inputs. The input and/or word comparison and key and/or character re-sizing processes as described above can be repeated.

In some embodiments, the processor 114 and/or prediction module 130 can limit the number of keys and/or characters with an increased size to a predefined number of keys and/or characters. For example, a total predefined number of keys and/or characters, and a total predefined number of keys and/or characters per line can be enforced by the processor 114 and/or prediction module 130. In this manner, the increased sizes of multiple keys 130(1)-130(N) and/or characters 131(1)-131(N) may not clutter the user interface 108 or otherwise interfere with the user's ability to discern the increased size of one or more keys 130(1)-130(N) and/or characters 130(1)-130(N). By way of example only, a suitable total predefined number of keys and/or characters may be 10, and a total predefined number of keys and/or characters per line may be 3.

In some embodiments, the processor 114 and/or prediction module 130 may limit the number of keys and/or characters with an increased size based on the proximity of increased sizes of keys and/or characters to each other. By way of example only, if 6 adjacent keys and/or characters are predicted inputs and are closely located in a relatively tight cluster on 1 or 2 rows, then the processor 114 and/or prediction module 130 may limit the number of increased sizes of keys and/or characters in the cluster to 3 total. In this manner, the limitation may help to avoid clutter on the user interface 108 or otherwise avoid interference with the user's ability to discern the increased size of one or more keys 130(1)-130(N) and/or characters 130(1)-130(N).

As briefly described above, the processor 114 and/or prediction module 130 can store one or more user inputs in the historical data 132 associated with the user device 104(1). In some embodiments, the processor 114 and/or prediction module 130 can detect completion of a word by the user 102(1), and the processor 114 and/or prediction module 130 can store the completed word in the dictionary data 134 associated with the user device 104(1). By way of example, the processor 114 and/or prediction module 130 may detect the user's input of a space, a punctuation mark, such as a comma, period, etc., or other non-alphanumeric character or input, after entering a series of inputs via keys 130(1)-130(N). Thus, the input of a space after the user's entry of a series of inputs via keys 130(1)-130(N) may indicate the end of a word, which is comprised of the series of inputs. Likewise, the user's input of a comma, period, other punctuation mark, or non-alphanumeric character after entry of a series of inputs may also indicate the end of a word, which is comprises of the series of inputs. In any instance, the processor 114 and/or prediction module 130 may detect one or more word boundaries, such as the user's input of a space or a period after entering a series of inputs, and based on these word boundaries, can determine the completion of a word. The processor 114 and/or prediction module 130 can store the completed word in the historical data 132, or in memory 116, or another data storage device.

In some embodiments, some or all of the functionality associated with the prediction module 130 may be performed by other prediction modules remote from the user device 104(1) or otherwise distributed to a processor, such as 136 and 148, associated with one or more servers, computers, or modules remote from the user device 104(1). For example, the prediction module 130 associated with the user device 104(1) may communicate with one or more other prediction modules, such as 160, hosted remotely from the user device 104(1), such as by one or more prediction and/or database service computers 146, to provide the functionality described above.

In some embodiments, some or all of the data associated with the historical data 132 and/or dictionary data 134 may be received and stored by other historical data stores, such as 162, and/or dictionary data stores, such as 164, remote from the user device 104(1) or otherwise distributed for storage in memory, such as 138 and 150, associated with one or more servers, computers, or modules remote from the user device 104(1). For example, the prediction module 130 associated with the user device 104(1) may interact with the historical data 162 and dictionary data 164 stored by the one or more prediction and/or database service computers 146.

In some embodiments, the processor 114 and/or prediction module 130 associated with the user device 104(1) may update the historical data 132 and/or dictionary data 134 stored at the user device 104(1), or vice-versa, may update historical data, such as 162, and/or dictionary data, such as 164, stored remotely from the user device 104(1). For example, during a periodic software or firmware update for the user device 104(1) initiated by or at the user device 104(1), updated portions of data from either or both historical data 162 and dictionary data 164 may be transmitted via the networks 112 from the one or more prediction and/or database service computers 146. The processor 114 can receive the updated portions of data and can store the received data in or otherwise update the historical data 132 and/or dictionary data 134 as needed.

In one use case, a user may operate a smart phone with a soft keyboard to type a search term into a search engine query box displayed on a user interface of the smart phone. The user may start a new word beginning with the letter V by typing the letter V. A prediction module may determine that the next letter with high probability could be I, O, or E. The corresponding keys on the soft keyboard can be increased in size for these 3 letters. The user types the next letter, such as O, and the prediction module changes the size of the letters I, O, and E back to their original sizes. The prediction module may determine that the next letter with high probability is I, C, M, or U, and increases the size of the corresponding keys on the soft keyboard for these 4 letters.

In another example use case, a user may operate a tablet with a soft keyboard to type an email using an email application program on the user interface of the tablet. The user may start a new word beginning with the letter V by typing the letter V. A prediction module may determine that the next letter with high probability could be I, O, or E. The corresponding characters on the soft keyboard, rather than the keys, can be increased in size for these 3 letters. The user types the next letter, such as O, and the prediction module changes the size of the characters I, O, and E back to their original sizes. The prediction module may determine that the next letter with high probability is I, C, M, or U, and increases the size of the corresponding characters on the soft keyboard for these 4 letters.

Figure 2:
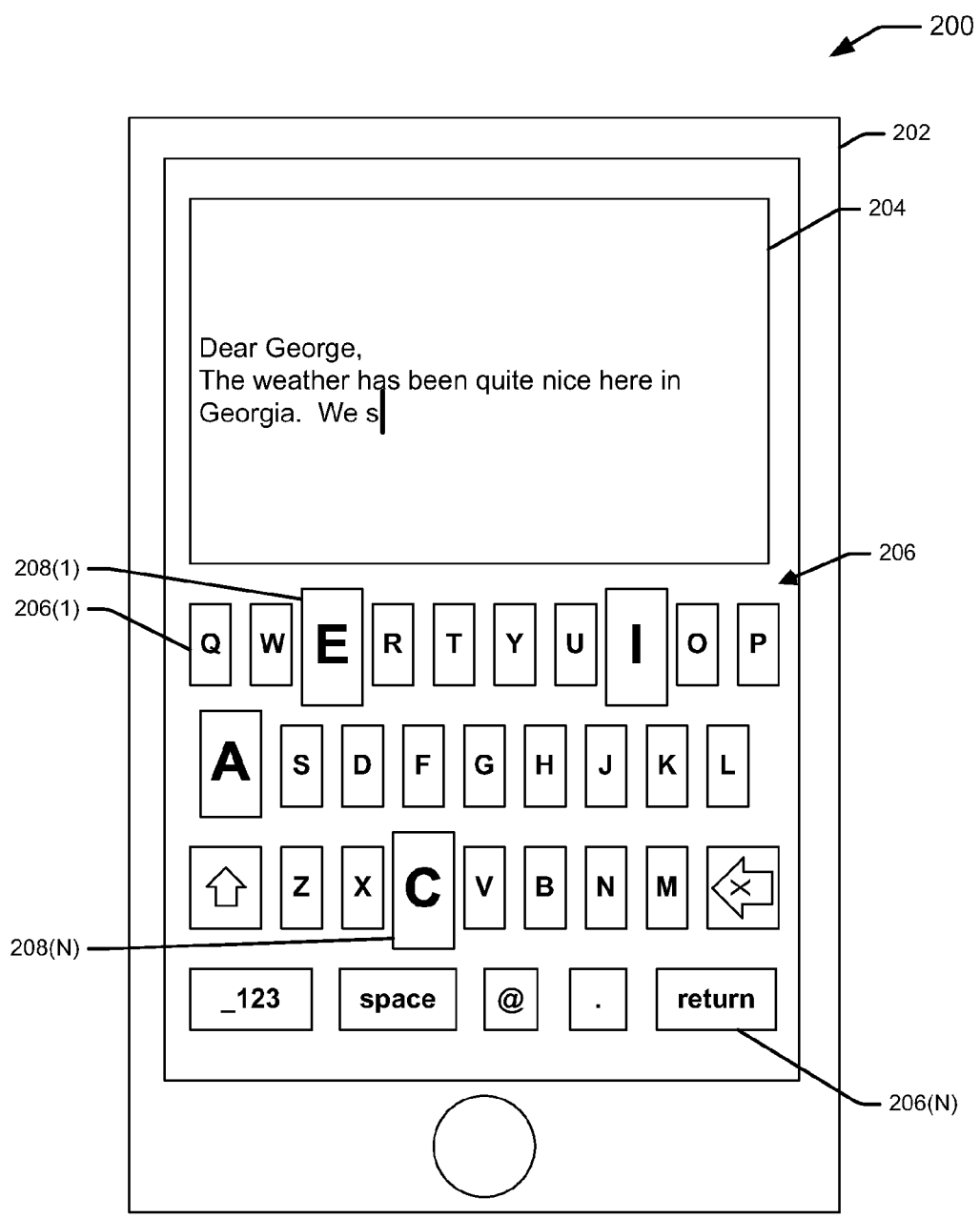
FIG. 2 illustrates an example soft keyboard with size changeable keys for a smart phone in accordance with an embodiment of the invention.

FIG. 2 illustrates an illustrative soft keyboard with size changeable keys for a user device in accordance with an embodiment of the invention. In FIG. 2, a user device 202, such as a smart phone, with a graphical user interface 204 and soft keyboard 206 is shown. The soft keyboard 206 can include any number of keys 206(1)-206(N) positioned relative to, for instance, below, the graphical user interface 204. As a user types on the soft keyboard 206, corresponding characters can be generated by the user device 202 on the graphical user interface 204.

In the embodiment shown in FIG. 2, the user device 202 can generate one or more size changeable keys 208(1)-208(N) as the user types on the soft keyboard 206. In some aspects, depending on the user's prior input, the user device 202 can determine one or more predicted inputs, and increase the size of the corresponding keys, such as 208(1)-208(N), relative to the other keys on the soft keyboard 206. The increased keys shown in this embodiment at E, I, A, and C. As the user continues typing on the soft keyboard 206, the user device 202 can resize keys, that were previously increased in size, back to their original size. The user device 202 can determine one or more additional predicted inputs, and increase the size of the corresponding keys relative to the other keys on the soft keyboard 206.

Other embodiments of a soft keyboard with size changeable keys for a user device can exist in accordance with an embodiment of the invention.

Illustrative Processes

Figure 3:
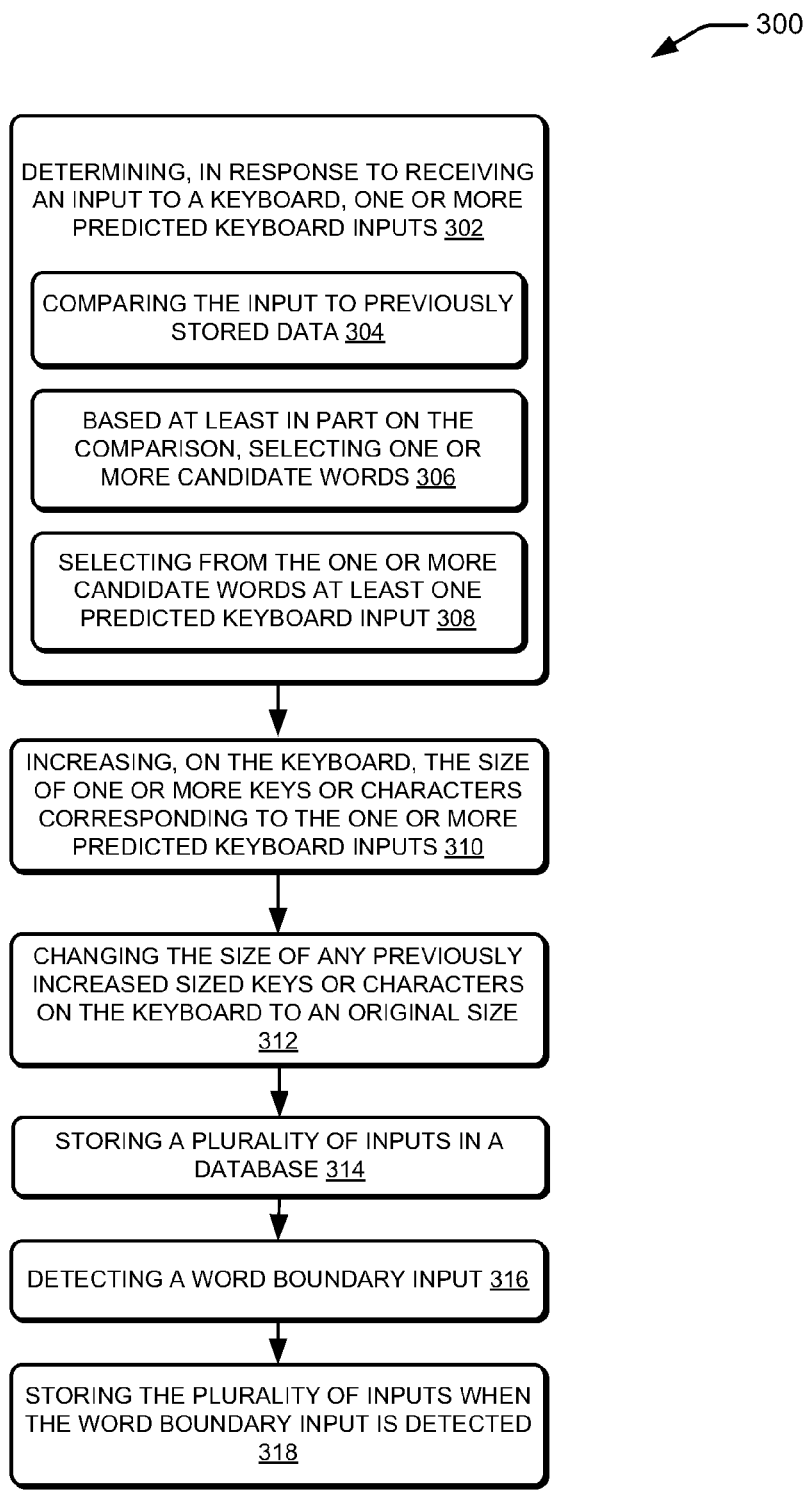
FIG. 3 illustrates an example flow diagram of example processes for providing a soft keyboard with size changeable keys for a smart phone in accordance with embodiments of the invention.

FIG. 3 illustrates example flow diagram of example processes 300 for providing a soft keyboard with size changeable keys for a user device in accordance with an embodiment of the invention. The processes are illustrated as a logical flow diagram, each operation of which represents one or a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. Additionally, the described processes may be performed by any number of suitable architectures and/or associated components, such as the architecture 100, user devices 104(1)-104(N), associated service provider computers 128 and/or prediction and/or database service computers 146 illustrated in FIG. 1.

Turning first to FIG. 3, example processes 300 for providing a soft keyboard with size changeable keys for a user device is illustrated. In some embodiments, the processes 300 may begin by determining, in response to receiving an input to a keyboard, one or more predicted keyboard inputs at block 302. An input to a soft keyboard for a user device, such as a smart phone, may be received from a user interacting with a user interface displaying the soft keyboard. A prediction module can determine or otherwise generate one or more predicted keyboard inputs based at least in part on the received input. For example, a user may initially input the letter V. The prediction module may determine that the next letter with high probability could be I, O, or E. In any instance, one or more predicted keyboard inputs can be determined based at least in part on the prior input. In some embodiments, a keyboard can include a soft keyboard output to a display screen of a processor-based device. In some embodiments, determining one or more predicted keyboard inputs can include determining one or more predicted keyboard inputs at a processor-based device associated with the keyboard or at a processor-based device remote from the keyboard.

Additionally or alternatively, at block 304, the input can be compared to previously stored data. In some embodiments, the previously stored data can include historical data or dictionary data. Additionally or alternatively, at block

306, based at least in part on the comparison, one or more candidate words can be selected. Additionally or alternatively, at block 308, at least one predicted keyboard input can be selected from the one or more candidate words.

In block 310, the size of one or more keys or characters corresponding to the one or more predicted keyboard inputs can be increased. In some embodiments, the shape of one or more keys corresponding to one or more predicted keyboard inputs can be differentiated in shape and/or displayed with additional prominence. In some embodiments, the size of a character can be increased on a key corresponding to one or more predicted keyboard inputs can be output by the processor 114 to the soft keyboard 110. In some instances, the characters on a key can be highlighted, increased in size, differentiated in shape, and/or otherwise displayed with additional prominence, either alone or in addition to, increasing the size of each key corresponding to one or more predicted keyboard inputs.

In block 312, the size of any previously increased sized keys or characters on the keyboard can be changed to an original size. In some embodiments, increasing, the size of one or more keys corresponding to the one or more predicted keyboard inputs can include limiting the number of the one or more keys to a predefined number based at least in part on the position of each key, the number of keys in each row of the keyboard, or the proximity of the one or more keys to each other.

In block 314, a plurality of inputs can be stored in a database. In some embodiments, the database can be a historical database stored on the user device and/or stored on a server remote to the user device.

In block 316, a word boundary input can be detected. In some embodiments, a word boundary input can include a space, a punctuation mark, or a non-alphanumeric character or input.

In block 318, the plurality of inputs can be stored when the word boundary input is detected. In some embodiments, one or more inputs preceding the word boundary input, such as a space, a punctuation mark, or a non-alphanumeric character or input, can be stored in a historical database at the user device and/or stored on a server remote to the user device.

The operations described and shown in the methods and/or processes 300 of FIG. 3 may be carried out or performed in any suitable order as desired in various embodiments. Additionally, in certain embodiments, at least a portion of the operations may be carried out in parallel. Furthermore, in certain embodiments, less than or more than the operations described in FIG. 3 may be performed.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
    at least one memory configured to store computer-executable instructions;
    at least one processor configured to access the at least one memory and execute the computer-executable instructions to:
        receive an input to a soft keyboard associated with a mobile device;

determine one or more likely words based at least in part on the input;
receive a prediction of one or more predicted keyboard inputs, wherein the prediction is based at least in part on contextual data associated with an application associated with the mobile device;
determine a first total number of keys in a first row of the soft keyboard;
determine a second total number of keys in a second row of the soft keyboard;
determine a first number of keys in the first row associated with the one or more predicted keyboard inputs;
determine a second number of keys in the second row associated with the one or more predicted keyboard inputs;
determine that the first number of keys does not exceed a pre-determined limit, wherein the pre-determined limit defines a maximum number of keys per row that are increased in size, wherein the pre-determined limit is less than a total number of keys in a particular row of the soft keyboard, and wherein the pre-determined limit for a particular row is determined independent of keys that are increased in size in a different row;
determine that the second number of keys does not exceed the pre-determined limit; and
increase a size of one or more keys in the first row and the second row of the soft keyboard corresponding to the one or more predicted keyboard inputs.

2. The system of claim 1, wherein the mobile device comprises a smart phone, a mobile phone, a messaging device, a laptop computer, a desktop computer, a tablet computer, a television, a set-top box, a game console, or a touch screen device.

3. The system of claim 1, wherein the computer-executable instructions further comprise computer-executable instructions to:
compare the input to previous user input or to a dictionary.

4. The system of claim 1, further comprising computer-executable instructions to:
limit the number of the one or more keys with an increased size to a predefined number of keys.

5. The system of claim 1, further comprising computer-executable instructions to:
detect completion of a word; and
store the word when the completion is detected.

6. The system of claim 1, further comprising computer-executable instructions to:
limit the number of the one or more keys to a predefined number based at least in part on the proximity of the one or more keys to each other.

7. A method, comprising:
determining, in response to receiving an input to a soft keyboard of a mobile device, one or more predicted keyboard inputs based at least in part on contextual data associated with an application associated with the mobile device;
determining a first total number of keys in a first row of the soft keyboard;
determining a second total number of keys in a second row of the soft keyboard;
determining a first number of keys in the first row associated with the one or more predicted keyboard inputs;
determining that the first number of keys does not exceed a pre-determined limit, wherein the pre-determined limit defines a maximum number of keys per row that are increased in size, wherein the pre-determined limit is less than a total number of keys in a particular row of the keyboard, and wherein the pre-determined limit for a particular row is determined independent of keys that are increased in size in a different row;
determining that the second number of keys does not exceed the pre-determined limit; and
increasing, on the soft keyboard, a size of one or more keys or characters in the first row and the second row corresponding to the one or more predicted keyboard inputs, wherein the number of the one or more keys is limited to a predefined number based at least in part on the proximity of the one or more keys to each other.

8. The method of claim 7, wherein the keyboard comprises a soft keyboard output to a display screen of a processor-based device.

9. The method of claim 7, wherein determining, in response to receiving an input to the soft keyboard, one or more predicted keyboard inputs comprises:
comparing the input to previously stored data;
determining a ranking of frequently typed words in order of frequency;
based at least in part on the comparison, selecting one or more candidate words, wherein the selected one or more candidate words comprises a top ranked word of the ranking; and
selecting from the one or more candidate words at least one predicted keyboard input.

10. The method of claim 7, wherein determining, in response to receiving an input to the soft keyboard, one or more predicted keyboard inputs comprises determining the one or more predicted keyboard inputs at a processor-based device associated with the keyboard or at a processor-based device remote from the keyboard.

11. The method of claim 7, wherein the previously stored data comprises historical data or dictionary data.

12. The method of claim 7, further comprising:
changing the size of any previously increased sized keys or characters on the soft keyboard to an original size.

13. The method of claim 7, further comprising:
storing a plurality of inputs in a database.

14. The method of claim 7, further comprising:
detecting a word boundary input; and
storing the plurality of inputs when the word boundary input is detected.

15. The method of claim 7, wherein the pre-determined limit for a particular row is determined independent of keys that are increased in size in a different row.

16. A system, comprising:
at least one memory configured to store computer-executable instructions;
at least one processor configured to access the at least one memory and execute the computer-executable instructions to:
receive an input to a soft keyboard associated with a user device;
determine, in response to receiving the input, one or more predicted keyboard inputs based at least in part on contextual data associated with an application associated with the user device;
determine a first total number of keys in a first row of the soft keyboard;
determine a second total number of keys in a second row of the soft keyboard;

determine a first number of keys in the first row associated with the one or more predicted keyboard inputs;

determine a second number of keys in the second row associated with the one or more predicted keyboard inputs;

determine that the first number of keys does not exceed a pre-determined limit, wherein the pre-determined limit defines a maximum number of keys that are increased in size, wherein the pre-determined limit is less than a total number of keys in a particular row of the keyboard, and wherein the pre-determined limit for a particular row is determined independent of keys that are increased in size in a different row;

determine that the second number of keys does not exceed the pre-determined limit; and transmit the one or more predicted keyboard inputs to the user device, wherein the one or more predicted keyboard inputs are used to increase a size of one or more keys in the first row and the second row of the soft keyboard on the user device corresponding to the one or more predicted keyboard inputs.

17. The system of claim 16, wherein the computer-executable instructions to determine, in response to receiving the input, one or more predicted keyboard inputs comprises computer-executable instructions to:

compare the input and previous inputs on the keyboard to previously stored data; and based at least in part on the comparison, return one or more probable characters.

18. The system of claim 17, wherein the previously stored data comprises historical data or dictionary data.

19. The system of claim 16, wherein the input is stored in a database.

20. The system of claim 16, further comprising computer-executable instructions to:

detect a word boundary input; and store a plurality of inputs when the word boundary input is detected.

21. One or more non-transitory computer-readable media storing computer-executable instructions that, when executed by at least one processor, configure the at least one processor to:

receive, in response to receiving an input to a soft keyboard associated with a user device, a prediction of one or more keyboard inputs based at least in part on contextual data associated with an application associated with the user device;

determine a first total number of keys in a first row of the soft keyboard;

determine a second total number of keys in a second row of the soft keyboard;

determine a first number of keys in the first row associated with the one or more predicted keyboard inputs;

determine a second number of keys in the second row associated with the one or more predicted keyboard inputs;

determine that the first number of keys does not exceed a pre-determined limit, wherein the pre-determined limit defines a maximum number of keys per row that are increased in size, wherein the pre-determined limit is less than a total number of keys in a particular row of the keyboard, and wherein the pre-determined limit for a particular row is determined independent of keys that are increased in size in a different row;

determine that the second number of keys does not exceed the pre-determined limit; and increase a size of one or more keys in the first row and the second row of the soft keyboard corresponding to the one or more predicted keyboard inputs.

22. The one or more computer-readable media of claim 21, wherein the computer-executable instructions to configure the processor to receive, in response to receiving an input to a keyboard associated with a mobile device, a prediction of one or more keyboard inputs comprises computer-executable instructions configured to:

compare the input to previous user input or to a dictionary.

23. The one or more computer-readable media of claim 22, wherein the previous user input or dictionary are stored in a memory associated with the user device.

24. The one or more computer-readable media of claim 22, wherein the previous user input comprise prior user input to the mobile device.

25. The one or more computer-readable media of claim 22, wherein the dictionary comprises a previously stored set of words on the mobile device.

26. The one or more computer-readable media of claim 21, further comprising computer-executable instructions to:

limit the number of the one or more keys to a predefined number based at least in part on the proximity of the one or more keys to each other.

* * * * *